United States Patent [19]

Nikoh et al.

[11] Patent Number: 4,991,021
[45] Date of Patent: Feb. 5, 1991

[54] DIGITAL VIDEO SIGNAL COMPENSATION CIRCUIT

[75] Inventors: Hidemitsu Nikoh; Munenori Kobayashi, both of Tokyo, Japan

[73] Assignee: NEC Corporation, Japan

[21] Appl. No.: 367,686

[22] Filed: Jun. 19, 1989

[30] Foreign Application Priority Data

Jun. 22, 1988 [JP] Japan ................................ 63-155511

[51] Int. Cl.⁵ ............................................. H04N 5/208
[52] U.S. Cl. ..................................... 358/162; 358/166
[58] Field of Search .................. 358/162, 166, 167, 36, 358/37, 167

[56] References Cited

U.S. PATENT DOCUMENTS 4,855,829  8/1989  Kihara .................................. 358/162
4,918,528  4/1990  Oohashi ............................... 358/162

Primary Examiner—Howard W. Britton
Assistant Examiner—Mark R. Powell
Attorney, Agent, or Firm—Leydig, Voit & Mayer

[57] ABSTRACT

In a digital video signal compensation circuit, a high frequency component of a digital video signal is obtained in a high-pass filter, and the high frequency component is compared in a comparator with a threshold signal, thereby determining whether the high frequency component is an edge component or a noise component. Where the high frequency component is the edge component, the high frequency component is added in an adder to the digital video signal, and where the high frequency component is a noise component, the high frequency component is subtracted in the adder from the digital video signal in accordance with the sign conversion of the high frequency component. Therefore, only one adder is provided in the digital video signal compensation circuit. That is, it is not necessary that an adder and a subtracter are provided therein.

3 Claims, 6 Drawing Sheets

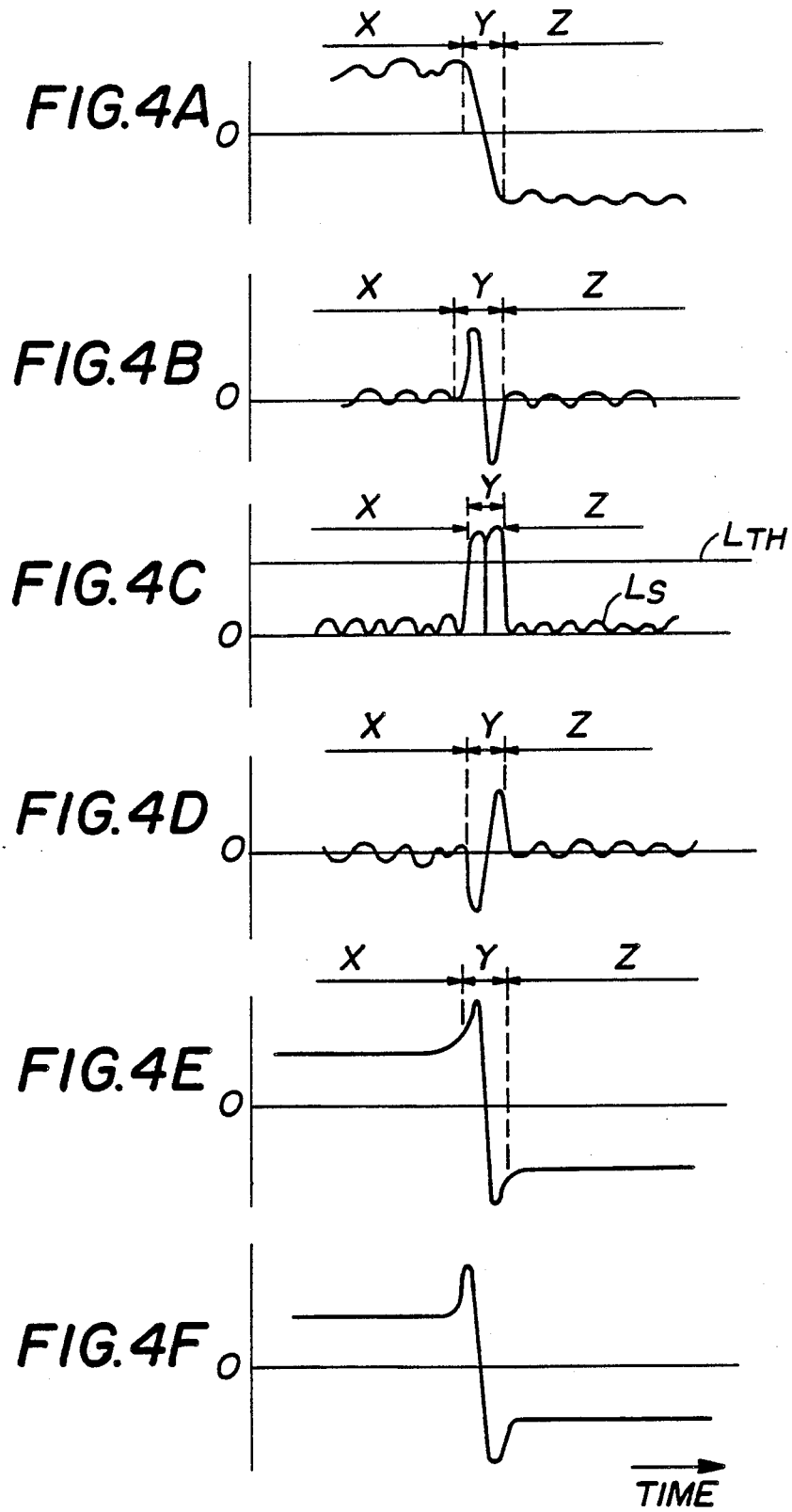

DIGITAL VIDEO SIGNAL COMPENSATION CIRCUIT

FIELD OF THE INVENTION

The invention relates to a digital video signal compensation circuit, and more particularly to a circuit for an aperture compensation and a noise cancellation in an apparatus for recording video signals into a recording medium and reading-out video signals from the recording medium.

BACKGROUND OF THE INVENTION

In an apparatus for recording video signals into a recording medium and reading-out video signals from the recording medium, one or both of an aperture compensation and a noise cancellation are generally carried out.

A conventional aperture compensation circuit comprises a high-pass filter connected at its input to an input terminal group, a coring circuit connected at its inputs to a threshold value input terminal group and an output of the high-pass filter, and an adder for adding an output signal of the coring circuit and a signal of the input terminal group to produce an added signal which is supplied to an output terminal group.

In operation, a high frequency component of a digital video luminance signal which is supplied from the input terminal group is passed through the high-pass filter, and a low level component of the high frequency component video luminance signal is cut-off in the coring circuit in the comparison with a threshold signal applied to the threshold value input terminal group. The high frequency component video luminance signal including no low level component is added in the adder with the digital video luminance signal directly supplied from the input terminal group to produce the added signal which is supplied to the output terminal group.

A conventional noise cancellation circuit comprises a high-pass filter connected at its input to an input terminal group, a limiter circuit connected at its inputs to an output of the high-pass filter and a threshold value input terminal group, and a subtracter connected at its inputs to an output of the limiter circuit and the input terminal group and at its output to an output terminal group.

In operation, a digital video luminance signal is applied to the input terminal group, and a high frequency component thereof is passed through the high-pass filter. A component of the high frequency component video luminance signal higher in its level than a threshold signal applied to the threshold value input terminal group is cut-off in the limiter circuit. An output signal of the limiter circuit is supplied to the subtracter, in which the digital video luminance signal is subtracted by the output signal of the limiter circuit. The subtracted signal is supplied to the output terminal group.

Consequently, a high frequency component of the digital video luminance signal is emphasized in the aperture compensation circuit, and a noise component is attenuated in the noise cancellation circuit.

According to the conventional aperture compensation circuit, however, there is a disadvantage that a noise component of the digital video luminance signal supplied directly from the input terminal group is not removed and remains included therein, where the aperture compensation circuit is solely used, because the directly supplied digital video luminance signal is added in the adder to the output signal of the coring circuit, in which a component lower than the threshold signal level is removed as a noise component.

According to the conventional noise cancellation circuit, further, there is a disadvantage that an edge of the output signal is smaller at the output terminal group than an edge of the digital video luminance signal supplied directly from the input terminal group, where the noise cancellation circuit is solely used, because the directly supplied digital video luminance signal is subtracted in the subtracter by the output signal of the limiter circuit, in which a component higher than the threshold signal level is removed as an edge component from the output signal of the high-pass filter. Therefore, the edge component is not sufficiently emphasized.

Even if the aperture compensation circuit and the noise cancellation circuit are both used, the emphasizing effect of an edge component is not sufficiently large for the same reason as set forth in the sole use of the noise cancellation circuit. Where the both circuits are used, there is resulted in a further disadvantage that a circuit scale becomes large, because the adder and the subtracter are required to be used. For instance, where the circuits are structured by a semiconductor integrated circuit (defined "IC" hereinafter), a chip area is increased, so that a fabricating cost becomes high.

SUMMARY OF THE INVENTION

Accordingly, it is an object of the invention to provide a digital video signal compensation circuit in which an edge component is sufficiently emphasized.

It is a further object of the invention to provide a digital video signal compensation circuit in which a noise component is perfectly removed.

It is a still further object of the invention to provide a digital video signal compensation circuit in which a circuit scale can be small.

According to the invention, a digital video signal compensation circuit comprises, a high-pass filter for passing a high frequency component of a digital video signal applied to a first input terminal;

a control circuit including an absolute value circuit and a comparator;

said absolute value circuit producing an absolute value signal of said high frequency component; and said comparator determining whether said high frequency component is an edge component or a noise component in accordance with the comparison of said absolute value signal with a threshold signal applied to a second input terminal, thereby producing a control signal;

a sign conversion circuit for converting a sign of said high frequency component to produce a sign-converted high frequency component;

a selection switch for passing a selected one from said high frequency component and said sign-converted high frequency component dependent on said control signal; and an adder for adding said digital video signal and said selected one to produce an output digital video signal supplied from an output terminal to a following stage;

wherein an addition is carried out in said adder, where said high frequency component is said edge component, and a subtraction is carried out, where said high frequency component is said noise component, whereby an aperture compensation and a noise cancellation of said digital video signal are performed in a common circuit.

BRIEF DESCRIPTION OF DRAWINGS

The invention will be described in more detail in conjunction with appended drawings wherein FIGS. 4A to 4F are timing charts showing operation a digital video signal compensation circuit in the first embodiment and a second embodiment according to the invention.

DESCRIPTION OF PREFERRED EMBODIMENTS

Before explaining a digital video signal compensation circuit according to the invention, the aforementioned conventional aperture compensation circuit and noise cancellation circuit will be explained in FIGS. 1 and 2.

Figure 1:
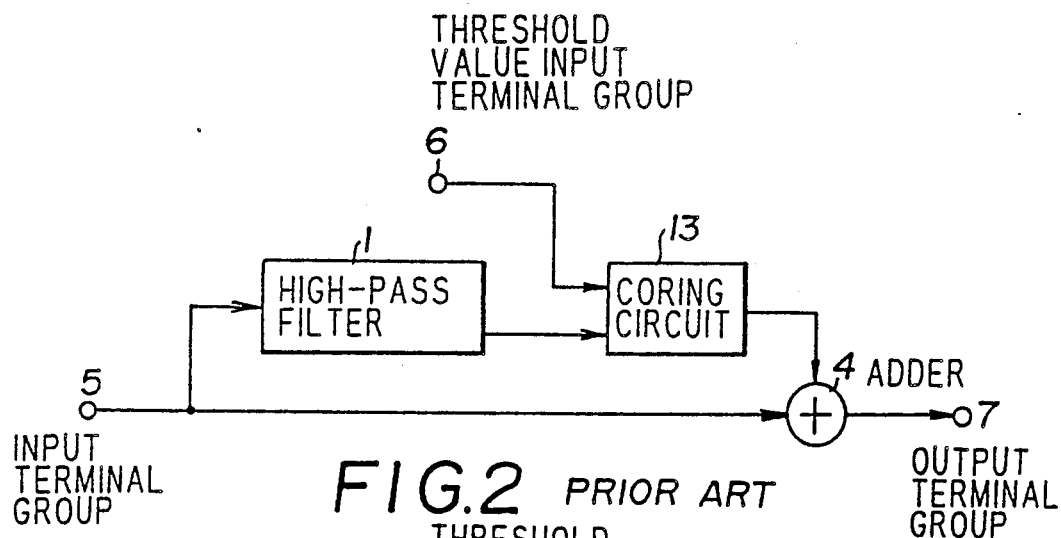
FIG. 1 is a block diagram showing a conventional aperture compensation circuit.

FIG. 1 shows the aperture compensation circuit which comprises a high-pass filter 1 for passing a high frequency component of a digital video luminance signal supplied from an input terminal group 5, a coring circuit 13 for cutting-off a component of the high frequency component which is lower than a level of a threshold signal applied to a threshold value input terminal group 6, and an adder 4 for adding an output signal of the coring circuit 13 and the digital video luminance signal supplied directly from the input terminal group 5 to produce an added signal which is supplied to an output terminal group 7.

Figure 2:
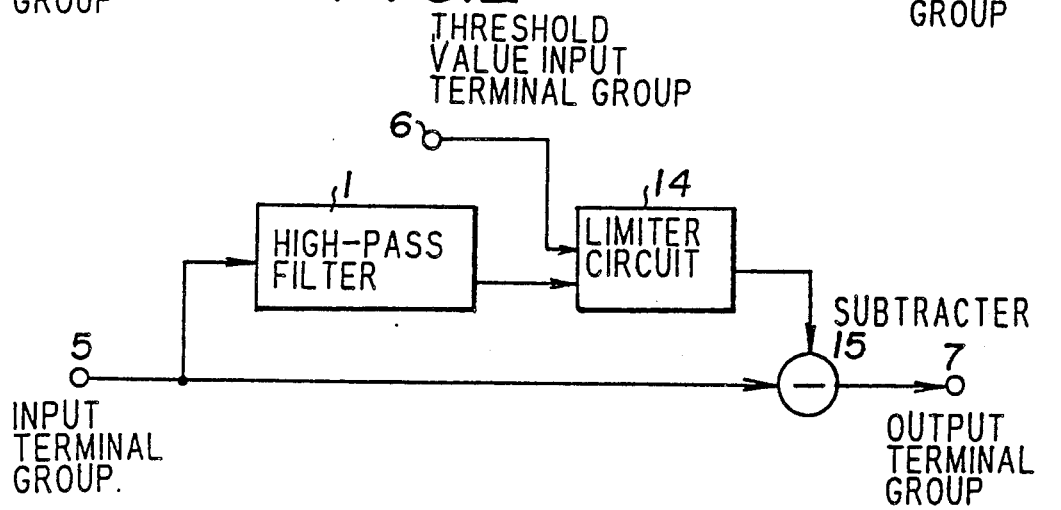
FIG. 2 is a block diagram showing a conventional noise cancellation circuit.

FIG. 2 shows the noise cancellation circuit which comprises a high-pass filter 1 for passing a high frequency component of a digital video luminance signal supplied from an input terminal group 5, a limiter circuit 14 for cutting-off a component of the high frequency component which is higher than a level of a threshold signal applied to a threshold value input terminal group 6, and a subtracter 15 for subtracting an output signal of the limiter circuit 14 from the digital video luminance signal supplied directly from the input terminal group 5.

Operation of the aperture compensation circuit and the noise cancellation circuit is not explained here, because it is described along with disadvantages thereof before.

Figure 3:
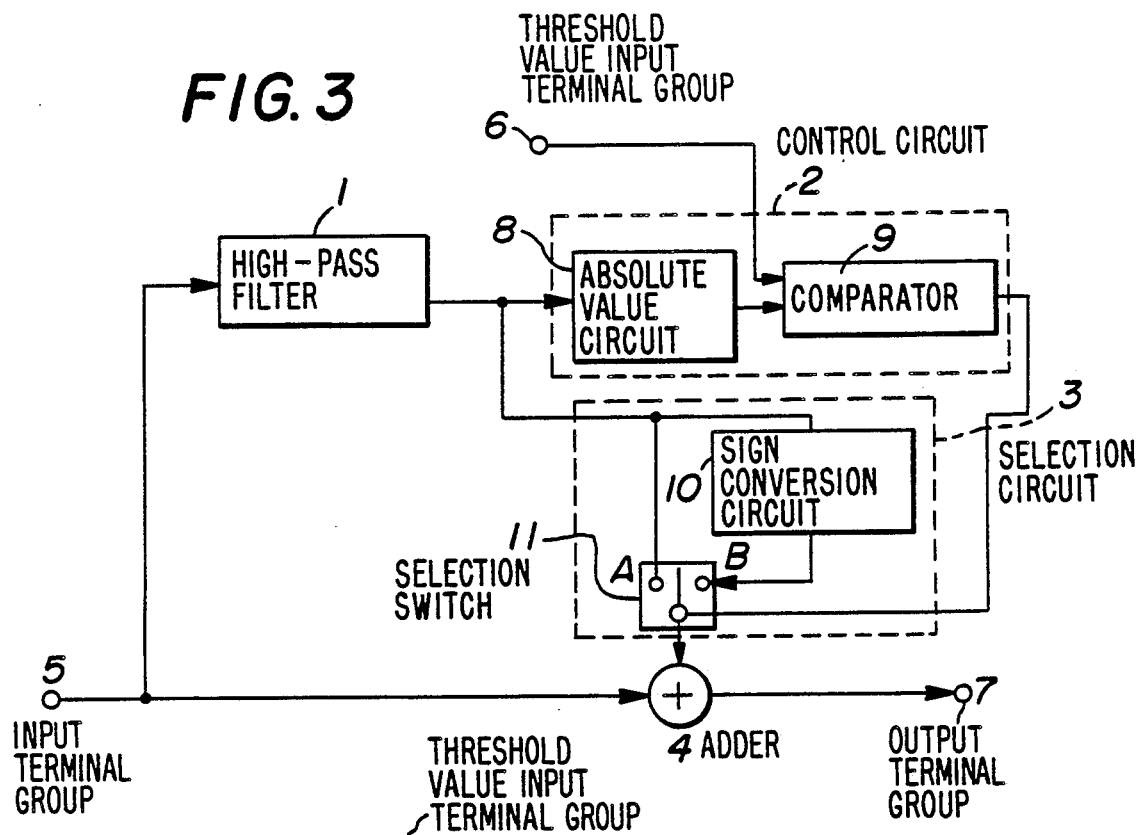
FIG. 3 is a block diagram showing a digital video signal compensation circuit in a first embodiment according to the invention.

Next, a digital video signal compensation circuit in a first embodiment according to the invention will be explained in FIG. 3. The digital video signal compensation circuit comprises a high-pass filter 1 for passing a high frequency component of a digital video luminance signal supplied from an input terminal group 5, a control circuit 2 for producing a control signal in accordance with an output signal of the high-pass filter 1 and a threshold signal supplied from a threshold value input terminal group 6, a selection circuit 3 for selecting the output signal of the high-pass filter 1 with or without the conversion of a sign of the output signal, and an adder for adding an output signal of the selection circuit 3 and the digital video luminance signal supplied directly from the input terminal group 5.

The control circuit 2 includes an absolute value circuit 8 connected at its input to the high-pass filter 1 and producing an absolute value of the high frequency component, and a comparator connected at its inputs to an output of the absolute value circuit 8 and a threshold value input terminal group 6 and producing the control signal.

The selection circuit 3 includes a sign conversion circuit 10 connected at its input to the output of the high-pass filter 1 and converting a sign of the high frequency component, and a selection switch 11 connected at its two inputs A and B to the output of the high-pass filter 1 and an output of the sign conversion circuit 10 and having an output which is switchable to a selected one of the two inputs A and B in accordance with the control signal and is connected to the adder 4.

In operation, a digital video luminance signal as shown in FIG. 4A is applied to the input terminal group 5, and a high frequency component of the digital video luminance signal is supplied from the high-pass filter 1 to the absolute value circuit 8 of the control circuit 2 as shown in FIG. 4B. In the absolute value circuit 8, negative components of the high frequency component are converted to positive components, thereby producing a high frequency absolute value signal as shown in FIG. 4C. Then, the high frequency absolute value signal is compared in the comparator 9 with the threshold signal applied to the threshold value input terminal group 6. Assuming that a level of the high frequency absolute value signal is $L_S$, and a level of the threshold signal is $L_{TH}$, a control signal of "1" is produced in the comparator 9, where $L_S$ is greater than $L_{TH}$, and a control signal of "b 0" is produced therein, where $L_S$ is less than $L_{TH}$. In FIG. 4C, the control signal "0" is produced at time periods X and Z, while the control signal "1" is produced at time period Y. The control signal "1" turns the output of the selection switch 11 on the input A thereof, while the control signal "0" turns the output thereof on the input B thereof. Therefore, the high-pass filter 1 is connected to the adder 4 at the time period Y. On the other hand, the sign conversion circuit 10 is connected to the adder 4 at the time periods X and Z. Consequently, a sign converted signal as shown in FIG. 4D is supplied to the adder 4 at the time periods X and Z, in which the sign converted signal is added to the digital video luminance signal supplied directly from the input terminal group 5, and the non-converted output signal of the high-pass filter 1 as shown in FIG. 4B is supplied to the adder at the time period Y, in which the non-converted output signal is added to the directly supplied digital video luminance signal. As a result, an added signal is obtained in the adder 4 as shown in FIG. 4E, and is supplied to the output terminal group 7. As clearly understood from the above, a noise cancellation operation is carried out at the time periods X and Z, and an aperture compensation operation is carried out at the time period Y, so that an output signal in which an edge is emphasized and noise is removed is obtained as shown in FIG. 4E. FIG. 4F will be explained in a second embodiment according to the invention later.

Figure 5:
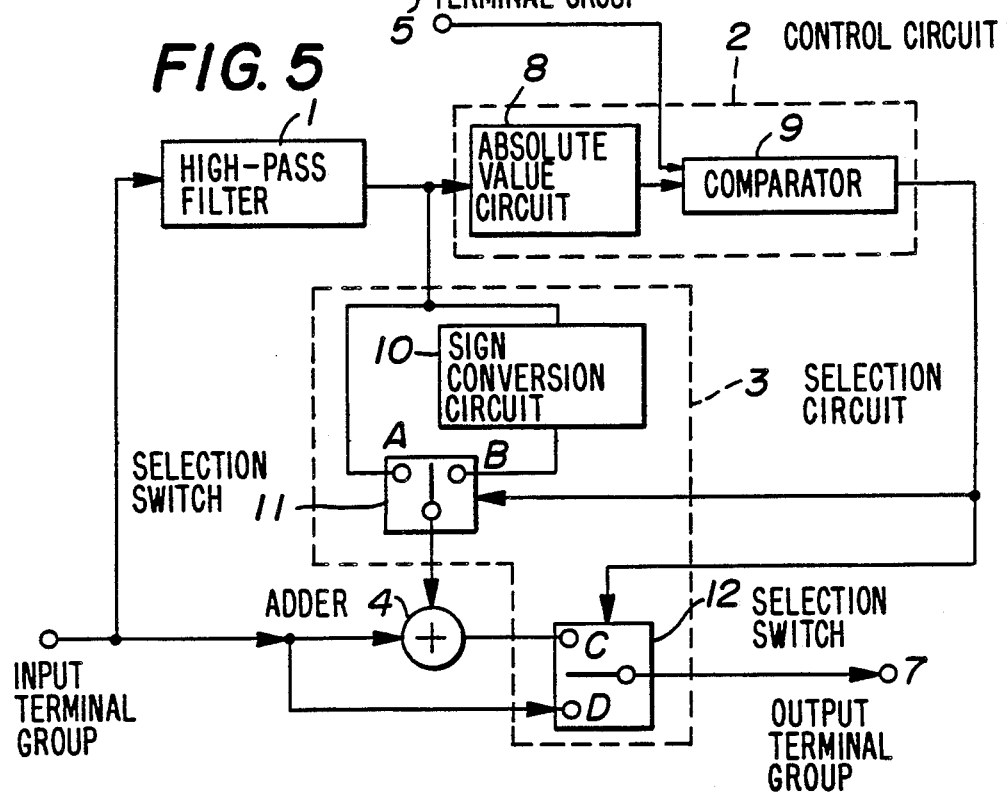
FIG. 5 is a block diagram showing a digital video signal compensation circuit in the second embodiment according to the invention.

FIG. 5 shows a digital video signal compensation circuit in the second embodiment according to the invention, wherein like parts are indicated by like reference numerals in the first embodiment. The digital video signal compensation circuit further comprises a selection switch 12 having two inputs C and D and an output which is turned on a selected one of the two inputs C and D in the selection circuit 3, in addition to the structure of FIG. 3. In the digital video signal compensation circuit, the input C of the selection switch 12 is connected to the output of the adder 4, the output D thereof is connected to the input terminal group 5, and the output of the selection switch 12 is connected to the output terminal group 7.

In operation, where a level $L_S$ of the output signal of the absolute value circuit 8 is greater or less than a level $L_{TH}$ of the threshold signal applied to the threshold value input terminal group 6, the output is turned on the input C in the selection switch 12 in accordance with the control signal from the comparator 9. As a result, the same circuitry structure is obtained as in the first embodiment, so that the same operation as explained in FIGS. 4A to 4E is carried out. On the other hand, where the level $L_S$ is equal to the level $L_{TH}$ ($L_S = L_{TH}$), the output is turned on the input D in the selection switch 12 in accordance with the control signal from the comparator 9. As a result, the digital video luminance signal applied to the input terminal group 5 as shown in FIG. 4A is supplied through the selection switch 12 to the output terminal group 7.

In accordance with the circuitry operation as described above, a signal having a waveform as shown in FIG. 4F is sup lied from the output terminal group 7 to a following stage.

In the second embodiment, more precise aperture compensation and noise cancellation are realized than those in the first embodiment, because an input signal of the input terminal group 5 is directly supplied to the output terminal group 7, where the level $L_S$ is equal to the level $L_{TH}$.

Figure 6:
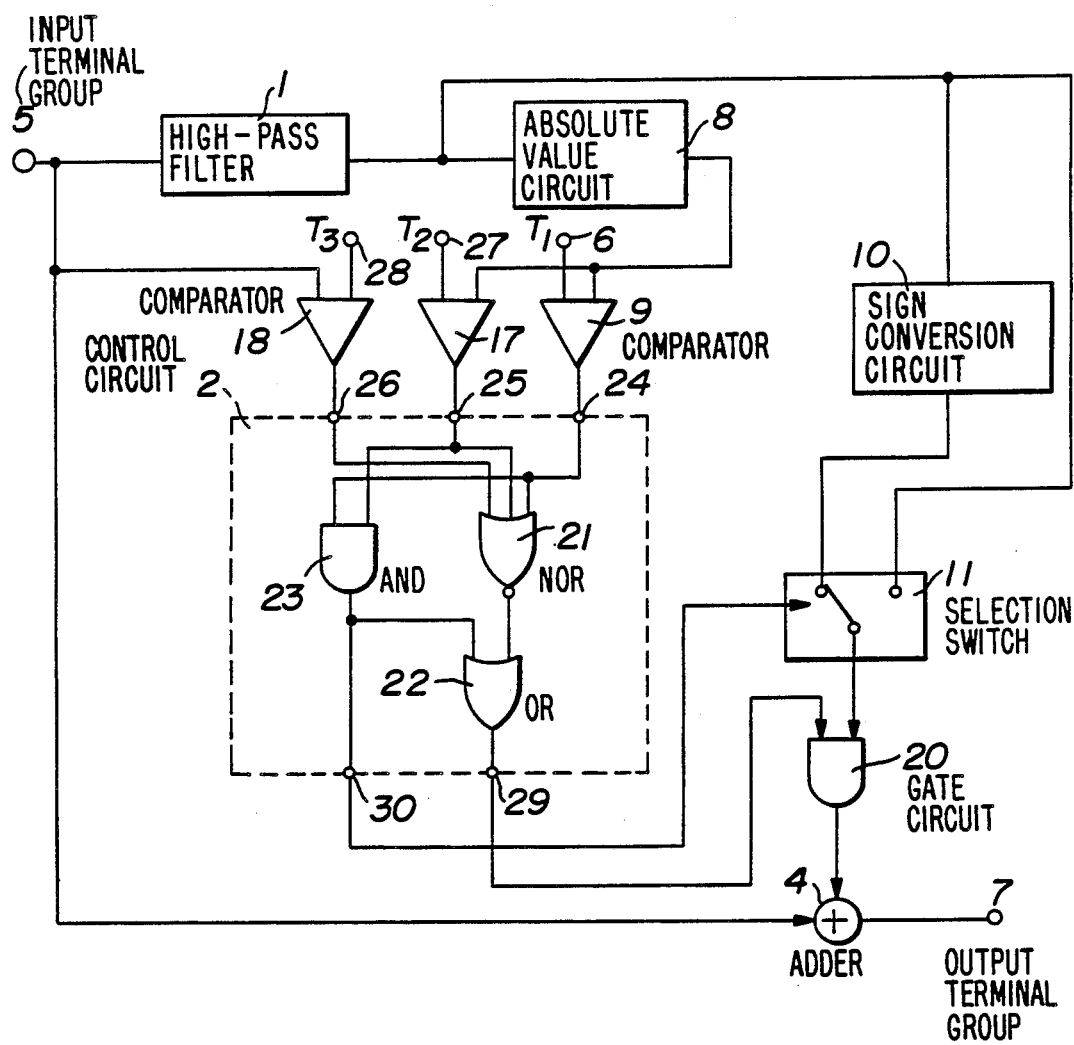
FIG. 6 is a block diagram showing a digital video signal compensation circuit in a third embodiment according to the invention.

FIG. 6 shows a digital video signal compensation circuit in a third embodiment according to the invention. In the digital video signal compensation circuit, an input terminal group 5 is connected to an input of a high-pass filter 1, one of two inputs of a comparator 18, and one of two inputs of an adder 4, an output of the high-pass filter 1 is connected to an input of an absolute value circuit 8, one of two inputs of a selection switch 11, and an input of a sign conversIon circuit 10, an output of the sign conversion circuit 10 is connected to the other one of the two inputs of the selection switch 11, an output of which is connected to one of two inputs of a gate (AND) circuit 20, and an output of the gate circuit 20 is connected to the other one of the two inputs of the adder 4, an output of which is connected to an output terminal group 7. Further, an output of the absolute value circuit 8 is connected to respective one inputs of comparators 9 and 17, input terminal groups 6, 27 and 28 are respectively connected to the remaining one inputs of the comparators 9, 17 and 18, outputs of which are connected to inputs 24, 25 and 26 of a control circuit 2, respectively, and outputs 29 and 30 of the control circuit 2 are connected to the other one of the two inputs of the gate circuit 20 and a control input of the selection switch 11, respectively. In the control circuit 2, the input 24 is connected to a first input of a three input NOR 21 and a first input of a two input AND 23, the input 25 is connected to a second input of the three input NOR 21 and a second input of the two input AND 23, the input 26 is connected to a third input of the three input NOR 21, an output of the two input AND 23 is connected to the output 30 and a first input of a two input OR 22, and an output of the three input NOR 21 is connected to a second input of the two input OR 22, an output of which is connected to the output 29.

Figure 7:
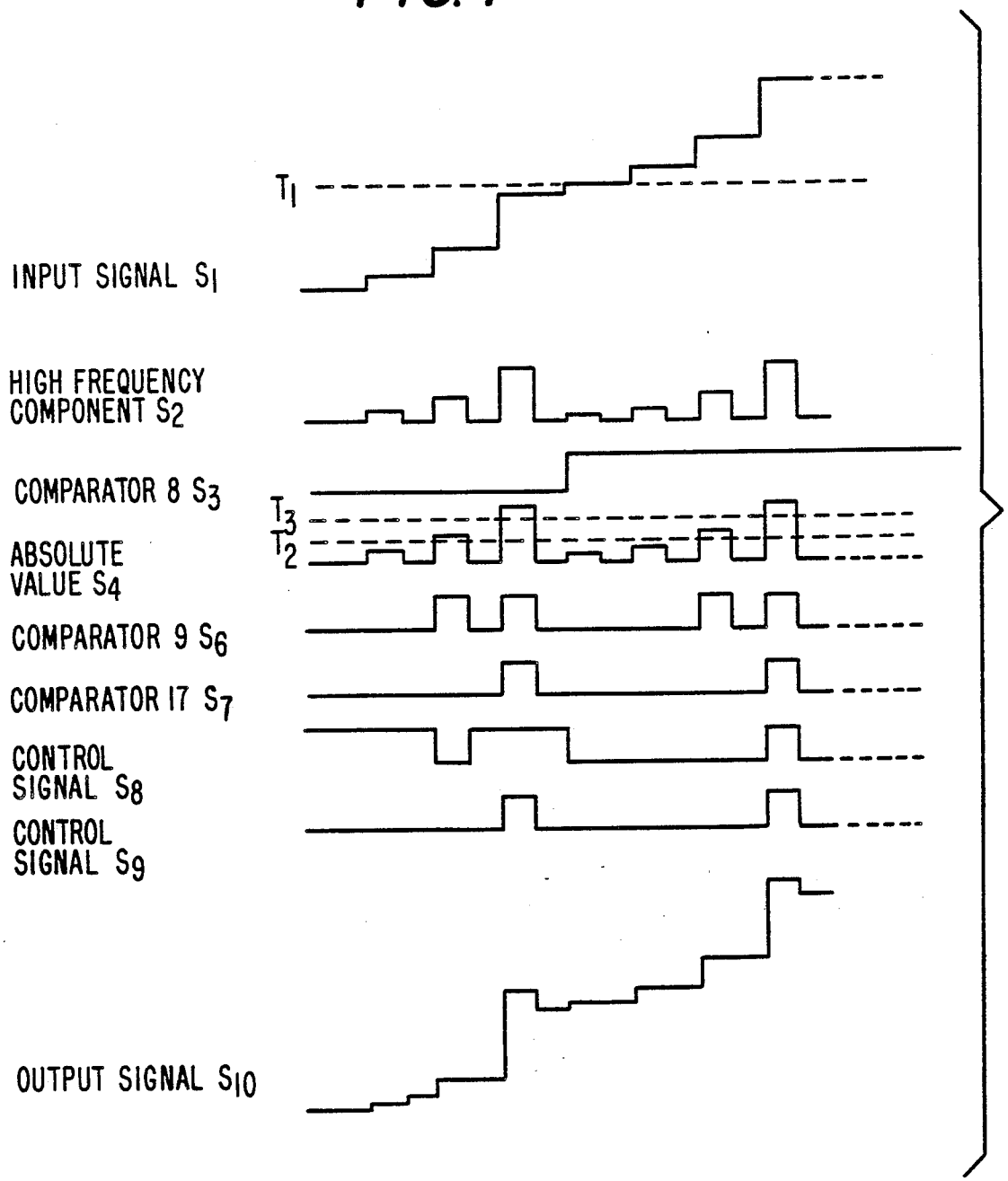
FIG. 7 is a timing chart showing operation in the third embodiment.

Operation of the digital video signal compensation circuit as described above will be explained in conjunction with FIG. 7. At first, an input signal S, is applied to the input terminal group 5, and is supplied to the adder 4, and the high-pass filter 1, through which a high frequency component signal $S_2$ is passed. The signal $S_2$ is supplied to the absolute value circuit 8, the sign conversion circuit 10, and the selection switch 11. In the sign conversion circuit, positive and negative values of the signal $S_2$ are inverted, respectively. The inverted signal is supplied to the remaining one of the two inputs of the selection switch 11. The selection switch 11 operates to select an output signal of the high-pass filter 1, where a control signal supplied from the output 30 of the control circuit 2 is high ("1"), and to select an output signal of the sign conversion circuit 10, where the control signal is low ("0"). Thus, the output signal of the high-pass filter 1 or the sign conversion circuit 10 is supplied through the selection switch 11 to the gate circuit 20, through which the output signal is supplied to the adder 4, where a control signal supplied from the output 29 of the control circuit 2 is high ("1"). On the other hand, all bits of the output signal passing through the selection switch 11 become "0" in the gate circuit 20, where the control signal is low ("0"). The high frequency component signal $S_2$ becomes an absolute value signal $S_4$ in the absolute value circuit 8, and the absolute value signal $S_4$ is compared in the comparators 9 and 17 with threshold values $T_2$ and $T_3$, so that comparator signals $S_6$ and $S_7$ are obtained therein. Operation of the comparators 9 and 17 as follows.

| ABSOLUTE VALUE SIGNAL $S_4$ | COMPARATOR SIGNAL $S_6$ |
|---|---|
| $\geq T_2$ | HIGH |
| $< T_2$ | LOW |

| ABSOLUTE VALUE SIGNAL $S_4$ | COMPARATOR SIGNAL $S_7$ |
|---|---|
| $\geq T_3$ | HIGH |
| $< T_3$ | LOW |

Further, the input signal is compared in the comparator 18 with a threshold value $T_1$ to produce a comparator signal $S_3$ as follows.

| INPUT SIGNAL $S_1$ | COMPARATOR SiGNAL $S_3$ |
|---|---|
| $\geq T_3$ | HIGH |
| $< T_1$ | LOW |

The comparator signals $S_3$, $S_6$ and $S_7$ are processed in the control circuit 2, so that the control signals $S_8$ and $S_9$ are supplied from the outputs 29 and 30 of the control circuit 2 to the gate circuit 20 and the selection switch 11, respectively. The signal processing of the control circuit 2 is as follows.

| CASE NUMBER | COMPARATOR SIGNAL | | | CONTROL SIGNAL | | OPERATION OF DIGITAL VIDEO SIGNAL COMPENSATION CIRCUIT |
| --- | --- | --- | --- | --- | --- | --- |
| | $S_3$ | $S_6$ | $S_7$ | $S_8$ | $S_9$ | |
| 1 | 0 | 0 | 0 | 1 | 0 | NOISE CANCELLATION |
| 2 | * | 1 | 1 | 1 | 1 | APERATURE COMPENSATION |
| 3 | * | * | * | * | * | NO SPECIFIC OPERATION |

Figure 8:
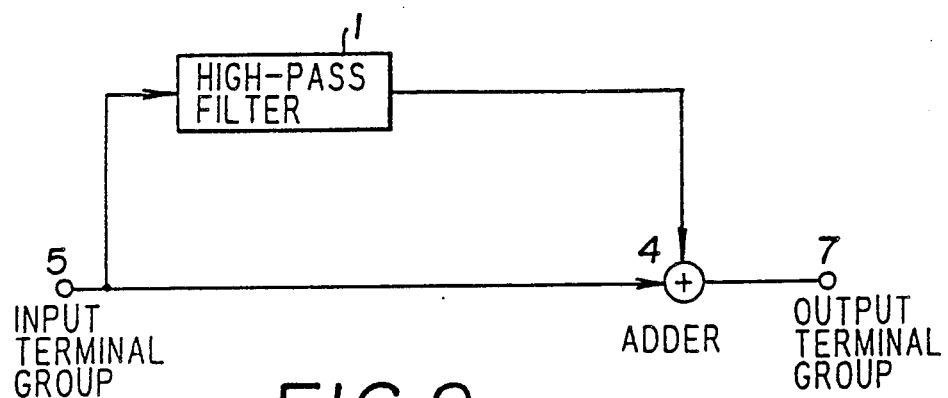
FIGS. 8 to 10 are block diagrams showing equivalent circuits in the third embodiment.
Figure 9:
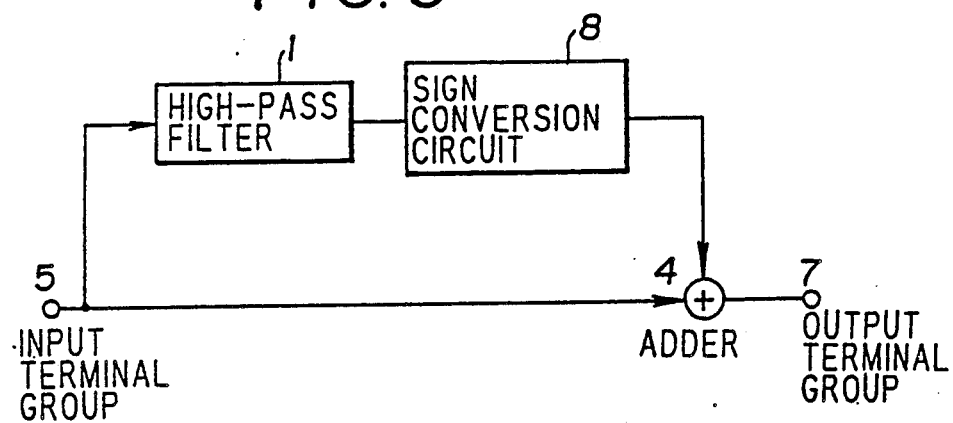
Figure 10:
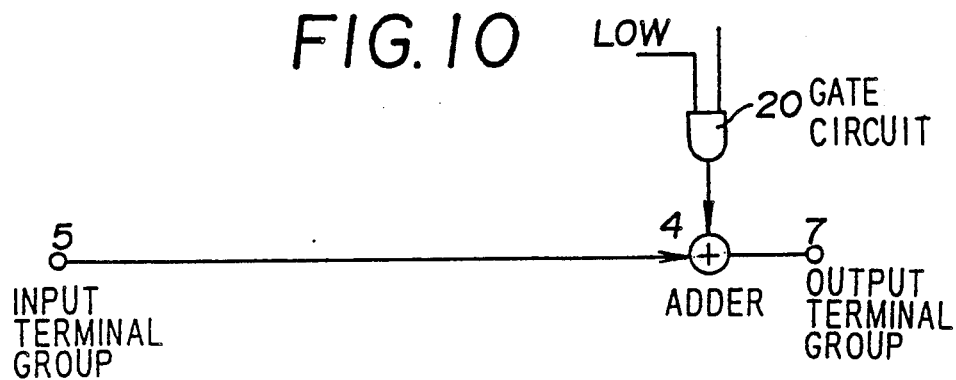

As explained in the above table, the control signals $S_8$ of "1" and $S_9$ of "0" are obtained, where the comparator signals $S_3$, $S_6$ and $S_7$ are all "0", so that the digital video signal compensation circuit of FIG. 6 becomes a noise cancellation circuit as shown in FIG. 8, and the control signals $S_8$ of "1" and $S_9$ of "1" are obtained, where the comparator signals $S_6$ and $S_7$ are both "1" (even if the comparator signal $S_3$ is any value), so that the digital video signal compensation circuit of FIG. 6 becomes an aperture compensation circuit as shown in FIG. 9. On the other hand, where the comparator signals $S_3$, $S_6$ and $S_7$ are of any combination of values as the case number 3 different from those of the case numbers 1 and 2 as listed in the above table, no specific operation is carried out in the digital video compensation circuit as shown in FIG. 10.

As described above in detail, a high frequency component of a digital video luminance signal is compared with a threshold signal to determine whether the high frequency component is an edge component or an noise component. Where the high frequency component is an edge component, the high frequency component is added to the digital video luminance signal, and where the high frequency component is a noise component, the high frequency component is subtracted from the digital video luminance signal in accordance with the sign conversion of the high frequency component, so that an aperture compensation and a noise cancellation are carried out in a single circuit. Therefore, only one adder is provided therein to make a scale of a circuit small as compared to the conventional circuit. As a result, where the circuit is fabricated by an IC, an area of the chip and a fabricating cost thereof are avoided to increase.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A digital video signal compensation circuit, comprising:
   a high-pass filter for passing a high frequency component of a digital video signal applied to a first input terminal;
   a control circuit including an absolute value circuit and a comparator;
   said absolute value circuit producing an absolute value signal of said high frequency component; and
   said comparator determining whether said high frequency component is an edge component or a noise component in accordance with the comparison of said absolute value signal with a threshold signal applied to a second input terminal, thereby producing a control signal;
   a sign conversion circuit for converting a sign of said high frequency component to produce a sign-converted high frequency component;
   a selection switch for passing a selected one from said high frequency component and said sign-converted high frequency component dependent on said control signal; and
   an adder for adding said digital video signal and said selected one to produce an output digital video signal supplied from an output terminal to a following stage;
   wherein an addition is carried out in said adder, where said high frequency component is said edge component, and a subtraction is carried out, where said high frequency component is said noise component, whereby an aperture compensation and a noise cancellation of said digital video signal are performed in a common circuit.

2. A digital video signal compensation circuit, according to claim 1 further comprising:
   an additional selection switch for passing a selected one from said output digital video signal of said adder and said digital video signal of said first input terminal dependent on said control signal.

3. A digital video signal compensation circuit, comprising:
   a high-pass filter for passing a high frequency component of a digital video signal applied to an input terminal;
   an absolute value circuit for producing an absolute value signal of said high frequency component;
   a sign conversion circuit for converting a sign of said high frequency component to produce a sign-converted high frequency component;
   first and second comparators for comparing said absolute value signal with first and second threshold signals to produce first and second comparator signals;
   a third comparator for comparing said digital video signal with a third threshold signal to produce a third comparator signal;
   a control circuit for processing said first to third comparator signals to produce first and second control signals;
   a selection switch for passing a selected one from said high frequency component and said sign-converted high frequency component dependent on said first control signal;
   a gate circuit for passing said selected one to provide a compensation and cancellation signal dependent on said second control signal; and
   an adder for adding said digital video signal of said input terminal and said compensation and cancellation signal to produce one selected from an aperture compensated digital video signal, a noise cancelled digital video signal, and an original digital video signal.

* * * * *